Feb. 14, 1928.
B. STEIN
APPARATUS FOR DETERMINING THE ALCOHOL IN A LIQUID
Filed April 15, 1927
1,658,950
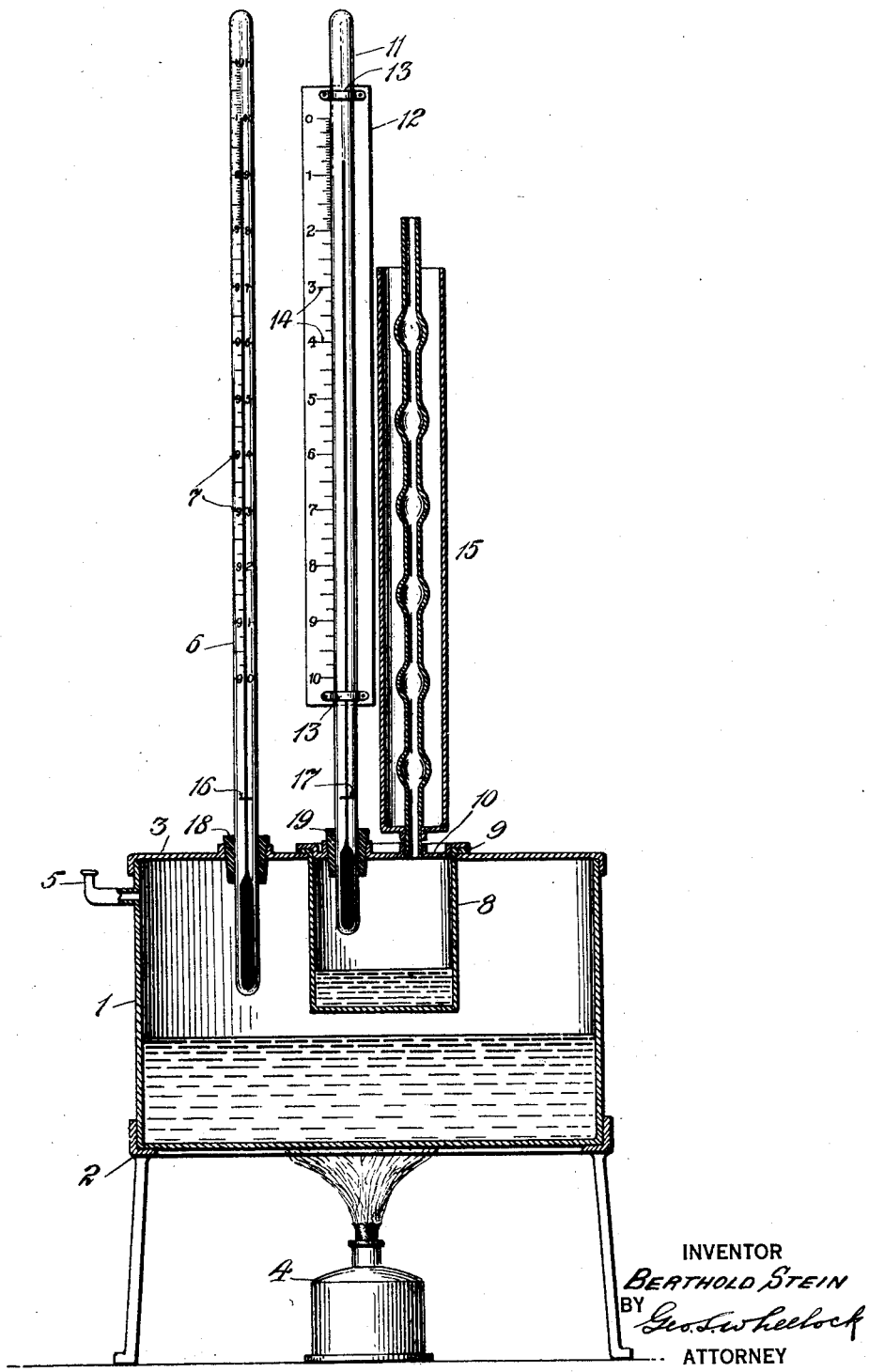
INVENTOR
BERTHOLD STEIN
BY
Geo. S. Wheelock
ATTORNEY Patented Feb. 14, 1928.

1,658,950

UNITED STATES PATENT OFFICE.

BERTHOLD STEIN, OF BROOKLYN, NEW YORK.

APPARATUS FOR DETERMINING THE ALCOHOL IN A LIQUID.

Application filed April 15, 1927. Serial No. 184,146.

This invention relates to apparatus enabling the alcoholic content of a liquid which is to be tested to be determined, which apparatus is based upon the determination of the boiling point of the liquid to be tested. Instruments in this general class are termed ebullioscopes or ebulliometers and are mostly used for determining the amount of alcohol in liquids which contain besides alcohol and water, further substances, such liquids being, for example, beer, wine, ale, cider, near beer, cereal and similar beverages more or less alcoholic.

In order to accurately determine the percentage of alcohol in a liquid, it is necessary to note the air pressure prevailing during the testing of the liquid. The instruments or apparatus heretofore in use for that purpose have no special provision for determining the influence of the air pressure while the testing is taking place. With such prior instruments the boiling point of water is first determined and thereafter the boiling point of the liquid to be tested for alcohol is determined by using the same container as was used for determining the boiling point of water. This procedure will not give exact results, which results are most desirable when determining the amount of alcohol contained in a liquid in which the amount does not run very high. It consumes about fifteen minutes from the time the heating of the water is commenced until the water is boiling; after which it takes at least fifteen minutes more to readjust the instrument; and finally another fifteen minutes, until the liquid to be tested will have commenced to boil. This means that it takes forty-five minutes from start to finish. However, it is well known, and I personally have made, particularly in connection with boiling point determinations, frequent observations, that within a few minutes of time the air pressure changed so greatly that the boiling point had changed to such an extent that the liquids to be tested for alcohol showed a difference of several per cent.

Therefore, the testing apparatus or instrument of the present invention is based upon the fact that the only correct and safe way to make a successful use of apparatus or instruments of the kind and which are based upon the method of boiling point determination, is to make the determination of the boiling point of the liquid to be tested simultaneously with the determination of the boiling point of the water, and in one and the same apparatus.

With this and other objects in view my invention consists of certain features of construction and combinations of parts to be hereinafter described and then claimed with reference to the accompanying drawing illustrating the preferred embodiment of the invention.

In the drawing, the apparatus is shown partly in section and partly in elevation.

Referring to the drawing, a water bath is provided comprising a container 1 supported upon a suitable frame 2 and provided with a cover 3. The water bath may be heated by an alcohol lamp 4 or heat may be obtained in any other preferred manner. The water bath is provided with an outlet 5 for the escape of steam and to relieve the internal pressure.

The cover 3 supports a thermometer 6, and preferably the same rises vertically from said cover. Preferably the thermometer 6 is graduated into ten or more graduations 7 indicating ten degrees or more centigrade, and each space between the successive graduations 7 is subdivided into twenty parts, as indicated in the upper part of the thermometer shown. The water bath of course will contain the water which is to be brought to boiling, and when the mercury column or other expansive medium forming the column rises to the graduation which will indicate that the water is boiling, the column will become steady and the temperature at which the water has boiled will be indicated by the thermometer in the usual manner.

The cover 3 of the water bath supports in a suitable manner a receptacle 8 which extends into the air space in the upper part of the water bath. This receptacle may be flanged so that it may be inserted through an opening in the cover 3, until the flange 9 rests upon the cover so as to support the receptacle. It is obvious that the receptacle could be set deeper to locate the flange 9 in the plane of the cover 3. The cover 10 of the receptacle 8 may be removable and have a friction fit into the receptacle. The cover 10 supports a second thermometer 11 which is for the purpose of enabling the determination of the boiling point of the liquid to be tested and which is in the receptacle 8. Preferably the second thermometer 11 rises vertically from the receptacle-cover 10 so as to be adjacent to and parallel with the first mentioned thermometer 6.

Preferably the second thermometer 11 is provided with a sliding scale 12 which is guided thereon by means of suitable guides 13 affixed to the scale and engaging over the thermometer tube 11. The scale 12 has the numbers for its graduations 14 running in inverse relation to the progression of the numbers of the graduations of the thermometer 6. This is necessary because the boiling point of the liquid to be tested will practically at all times be lower than the boiling point of water indicated on the thermometer 6, and in practice the distances between the graduations slightly increase progressively downwardly on the scale as is well known to those who are experienced in the use of ebullioscopes. However, the drawing presented herewith is in such relatively small dimensions, as compared with the full-sized apparatus, that it is impossible to show on the scale of thermometer 11 the actual varying distances between graduations for enabling an exact determination of alcoholic content by volume. Such scale for actual use is graduated according to the various boiling points of alcoholic mixtures, corresponding with the percentage of alcohol by volume or weight, at a given atmospheric pressure. Hence, the drawing is only by way of suggestion to those skilled in the art.

Each space between successive graduations 14 is shown as subdivided into twenty parts, as indicated in the upper part of the scale 12, but it is obvious that there may be a finer sub-division, as for example fifty or one hundred parts, for very exact determinations. There would here also be a shade of difference in distance between the sub-divisions, but this is impossible of illustration. A sliding scale 12 is preferred, but it is obvious that the thermometer 11 may be graduated throughout its tube in the usual manner, although to determine the percentage of alcohol by the boiling point of the liquid to be tested the well known tables will have to be resorted to.

The reflux condenser 15 is preferably employed for condensing the vapors rising from the receptacle 8, to which end the same also preferably extends vertically upwards parallel with the two thermometers. A reflux condenser, such as illustrated, is for the purpose of maintaining the liquid to be tested at normal strength, by returning the condenser vapors to receptacle 8.

In the operation of the described apparatus preferably pure water is used in the water bath, and after the lamp or burner 4 under the water bath is lighted, the water will start to boil in a short time. When the water has been heated to the boiling point, the column of mercury in the thermometer 6 will cease to fluctuate and will become stationary, and then the temperature at which the boiling point has been attained, may be read off from the thermometer 6 in the usual manner. As soon as the thermometer 6 shows that the water has been heated to the boiling point, if, for example, the thermometer indicates a boiling point of one hundred degrees centigrade, the zero mark (0) of the sliding scale 12 is adjusted by moving the scale so as to set such zero mark directly in horizontal alignment with the graduation indicating one hundred degrees centigrade on thermometer 6. The movement of the scale 12 and the registration of the zero mark thereon with the graduation of one hundred degrees centigrade on thermometer 6 takes but a moment. The percentage of alcohol contained in the liquid to be tested may then be simultaneously read off from the scale 12 of the thermometer 11 after the column of mercury therein becomes stationary.

In the drawing it is assumed that the mercury column of thermometer 11 has risen so as to indicate fifteen twentieths of one per cent of alcohol in the liquid which is being tested. It will be perfectly clear how the determinations and reading may be made without further explanation. Outstanding features of the present invention are the enabling of the simultaneous reading, in the same apparatus, of the boiling point of the liquid to be tested with the boiling point shown for the water, and the consequent saving of time. These factors are of extreme importance, because the two readings may be made with respect to the atmospheric pressure at a given time. As another factor in the saving of time, it may be mentioned that it is necessary to eliminate from the usual water container all water which had been therein before the liquid to be tested is placed in the same container, as is customary practice.

Preferably the thermometer 6 is provided with an indicating mark 16 and the thermometer 11 with a similar indicating mark 17. These two indicating marks are located at the adjacent lower ends of the thermometers and their purpose is to provide convenient indexes to the one who adjusts the apparatus. That is to say when the indicating marks 16, 17 are in horizontal alignment they indicate that the thermometers have been submerged in their appropriate receptacles for a safe distance, with the lower ends of the tubes above the water which is introduced into the water bath and the liquid which is introduced into the receptacle 8.

For the purpose of obtaining more accurate readings it is preferred that the thermometers 6, 11 be insulated against the conduction of heat from the adjacent metal parts of the covers of the water bath and receptacle for the liquid to be tested. Preferably this is accomplished by providing the thermometer 6 with a plug 18 of rubber or other heat insulating material, which plug is inserted into a hole in the cover 3 and is held tightly therein, the thermometer 6 being suitably adjusted with reference to the plug 18. A similar plug 19 of hard rubber or other insulating material is provided for the thermometer 11, to fit snugly into a hole in the receptacle cover 10.

Other changes in the illustrated and described apparatus can of course be resorted to by those skilled in the art without departing from the invention as defined in the appended claims; for instance, a thermometer graduated exactly as depicted in the drawing on scale 12 may be used to determine the percentage of alcohol from the boiling points of the liquid to be tested, respectively, of the corrected boiling points according to the prevailing boiling point of water during the operation.

What I claim as new is:

1. In apparatus for determining the alcoholic content of a liquid to be tested, the combination of a water-bath, a thermometer to indicate the boiling point of water in the water-bath, a receptacle for the liquid to be tested and which extends into the air space of the water-bath, a second thermometer mounted on the receptacle, and to be read simultaneously with the first thermometer when the columns of expansive medium in both thermometers become stationary, and a condenser for vapors arising from the receptacle; whereby the percentage of alcohol in the liquid may be determined when the columns of both thermometers become stationary.

2. In apparatus for determining the alcoholic content of a liquid to be tested, the combination of a water-bath; a thermometer supported by the cover of the water-bath and to indicate the boiling point of water in the water-bath, a receptacle for the liquid to be tested and which is supported by the said cover and extends into the air space of the water-bath, a second thermometer mounted on the receptacle, and to be read simultaneously with the first thermometer when the columns of expansive medium in both thermometers become stationary, and a condenser for vapors arising from the receptacle; whereby the percentage of alcohol in the liquid may be determined when the columns of both thermometers become stationary.

3. In apparatus for determining the alcoholic content of a liquid to be tested, the combination of a water-bath, a thermometer supported by the cover of the water-bath and to indicate the boiling point of water in the water-bath, a receptacle for the liquid to be tested and which is supported by the said cover and extends into the air space of the water-bath, a second thermometer mounted on the receptacle, and to be read simultaneously with the first thermometer when the columns of expansive medium in both thermometers become stationary, and a condenser for vapors arising from the receptacle; whereby the percentage of alcohol in the liquid may be determined when the columns of both thermometers become stationary, both of the thermometers being directly supported by heat insulating material.

4. In apparatus for determining the alcoholic content of a liquid to be tested, the combination of a water-bath, a thermometer supported by the cover of the water-bath and to indicate the boiling point of water in the water-bath, a receptacle for the liquid to be tested and which is supported by the said cover and extends into the air space of the water-bath, a second thermometer mounted on the receptacle, and to be read simultaneously with the first thermometer when the columns of expansive medium in both thermometers become stationary, and a condenser for vapors arising from the receptacle; whereby the percentage of alcohol in the liquid may be determined when the columns of both thermometers become stationary, the covers of the water-bath and the receptacles having plugs of heat insulating material through which the thermometers extend.

5. In apparatus for determining the alcoholic content of a liquid to be tested, the combination of a water-bath, a thermometer to indicate the boiling point of water in the water-bath, a receptacle for the liquid to be tested and which extends into the air space of the water-bath, a second thermometer mounted on the receptacle, and having a sliding scale to be read simultaneously with the first thermometer when the columns of expansive medium in both thermometers become stationary, and a condenser for vapors arising from the receptacle; whereby the percentage of alcohol in the liquid may be determined when the columns of both thermometers become stationary.

6. In apparatus for determining the alcoholic content of a liquid to be tested, the combination of a water-bath, a graduated thermometer to indicate the boiling point of water in the water-bath, a receptacle for the liquid to be tested and which extends into the air space of the water-bath, a second thermometer mounted on the receptacle and having graduations reading reversely to those of the first thermometer and which indicate the percentage of alcohol in alcoholic liquids based upon the boiling points of such liquids at the same air pressure, and the thermometers adapted to be read simultaneously when the columns of expansive medium in both thermometers become stationary, and a condenser for the vapors arising from the receptacle; whereby the percentage of alcohol in the liquid may be determined when the columns of both thermometers become stationary.

7. In apparatus for determining the alcoholic content of a liquid to be tested, the combination of a water-bath, a thermometer, rising vertically from the cover of the water-bath, and to indicate the boiling point of water in the water-bath, a covered receptacle for the liquid to be tested, the receptacle extending into the air space of the water-bath, a second thermometer, rising vertically from the cover of the receptacle, and to be read simultaneously with the first thermometer when the columns of expansive medium in both thermometers become stationary, and a condenser for vapors arising from the receptacle, whereby the percentage of alcohol in the liquid may be determined when the columns of both thermometers become stationary.

8. In apparatus for determining the alcoholic content of a liquid to be tested, the combination of a water-bath, a thermometer, rising vertically from the cover of the water-bath, and to indicate the boiling point of water in the water-bath, a covered receptacle for the liquid to be tested, the receptacle extending into the air space of the water-bath, a second thermometer, rising vertically from the cover of the receptacle, and to be read simultaneously with the first thermometer when the columns of expansive medium in both thermometers become stationary, both thermometers being parallel and having horizontally alignable graduations for enabling the correct vertical adjustment of the thermometers to be readily ascertained, and a condenser for vapors arising from the receptacle, whereby the percentage of alcohol in the liquid may be determined when the columns of both thermometers become stationary.

BERTHOLD STEIN.